Sept 8, 1925.
C. H. WEAVER
1,553,057
MECHANICAL FINGERING DEVICE FOR STRINGED MUSICAL INSTRUMENTS
Filed Jan. 31, 1924  4 Sheets-Sheet 1
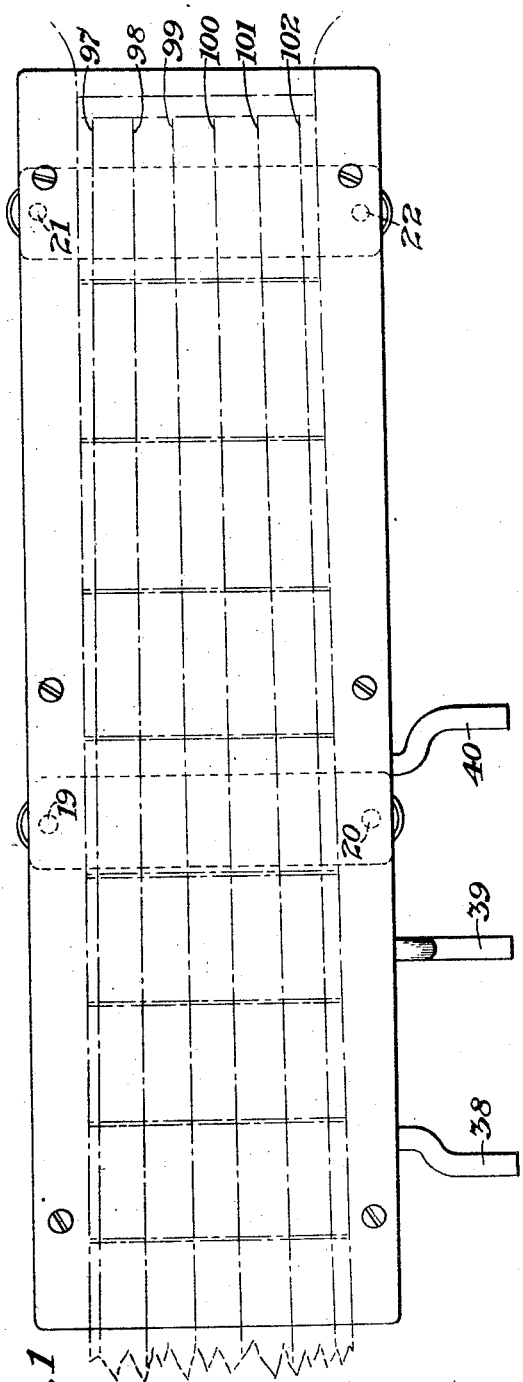
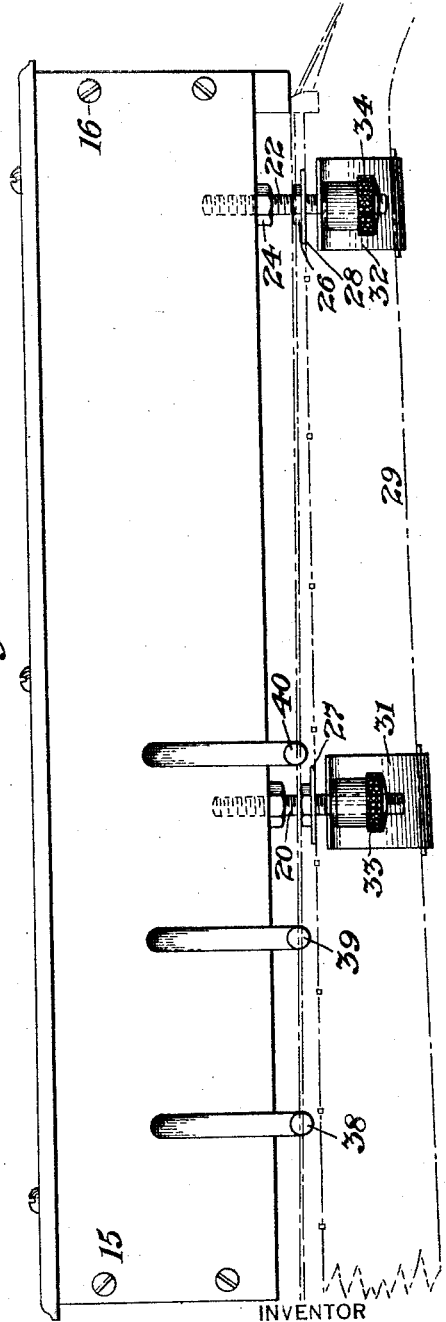
INVENTOR
Charles H. Weaver
BY
Serrell Son
HIS ATTORNEYS

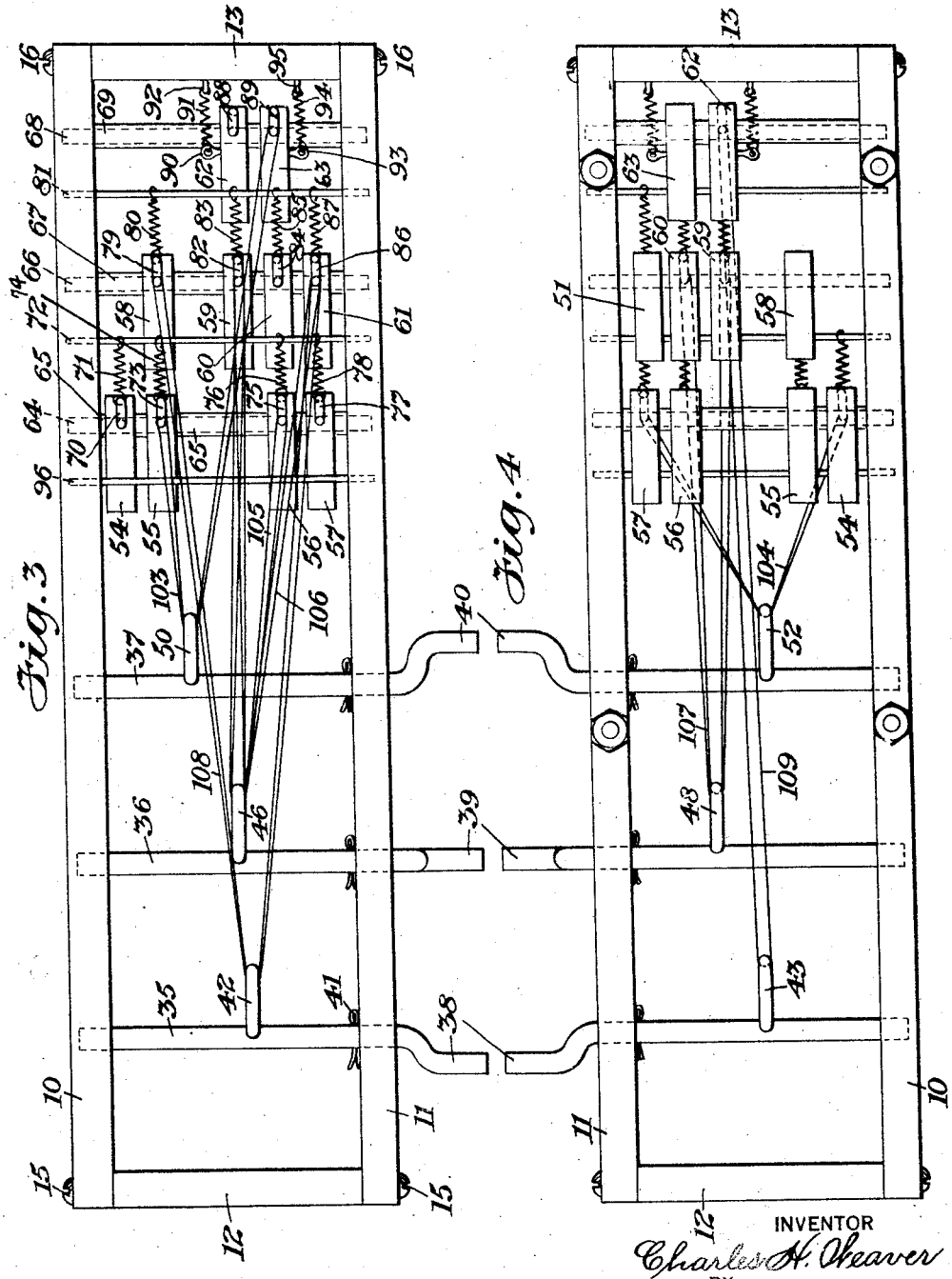

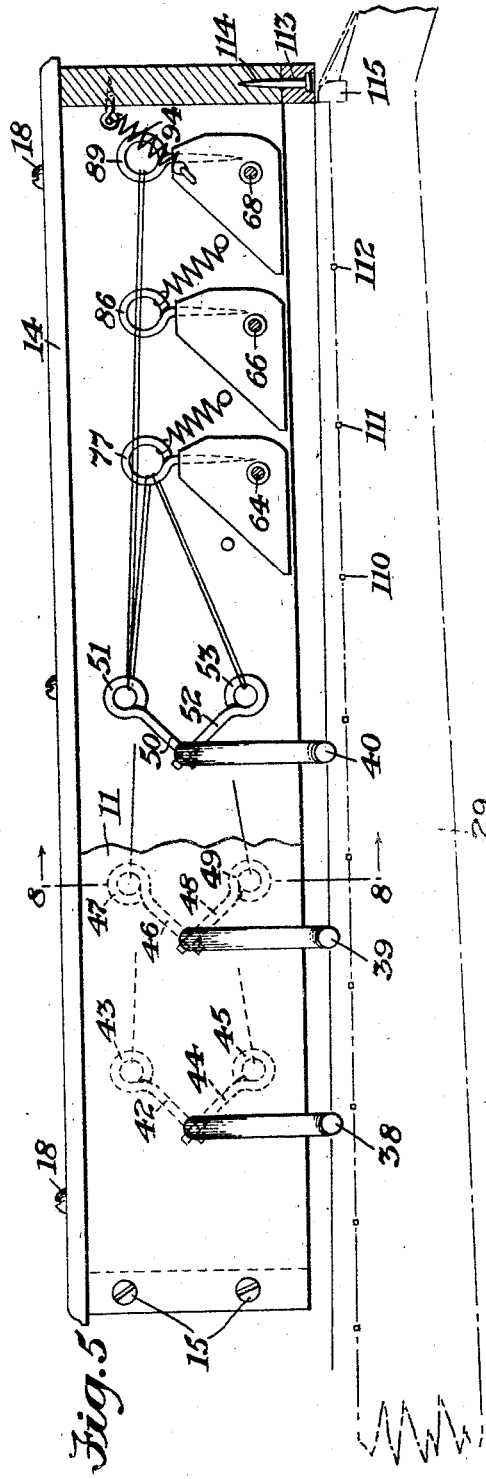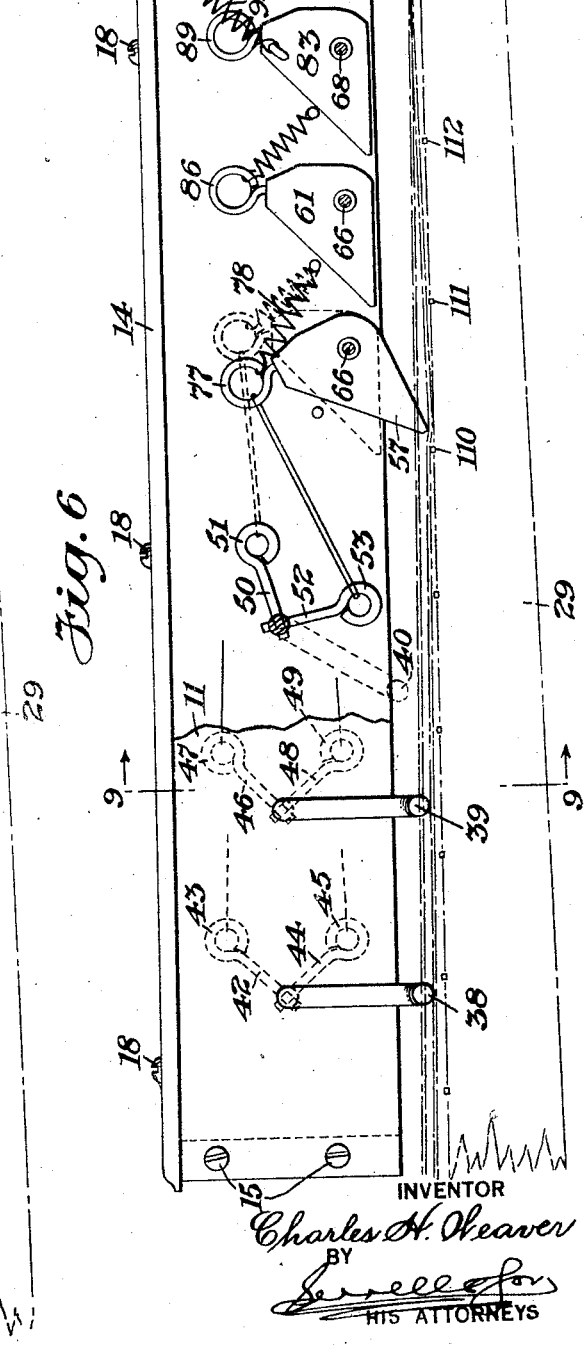

Sept. 8, 1925.                                                1,553,057
                         C. H. WEAVER
         MECHANICAL FINGERING DEVICE FOR STRINGED MUSICAL INSTRUMENTS
                    Filed Jan. 31, 1924          4 Sheets-Sheet 4
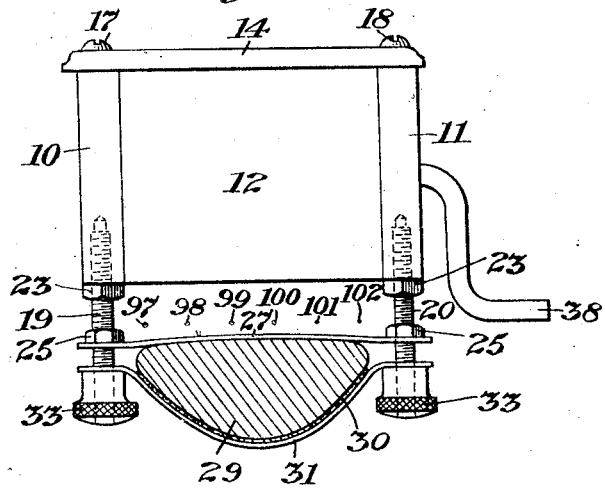
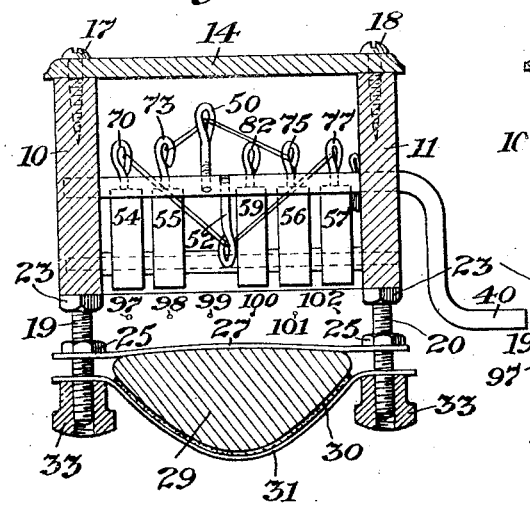 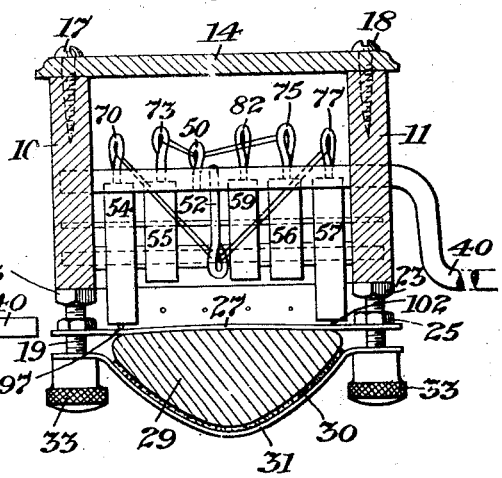
INVENTOR
Charles H. Weaver
BY
HIS ATTORNEYS Patented Sept. 8, 1925.

1,553,057

UNITED STATES PATENT OFFICE.

CHARLES H. WEAVER, OF BETHLEHEM, PENNSYLVANIA.

MECHANICAL FINGERING DEVICE FOR STRINGED MUSICAL INSTRUMENTS.

Application filed January 31, 1924. Serial No. 689,604.

*To all whom it may concern:*

Be it known that I, CHARLES H. WEAVER, a citizen of the United States, residing at Bethlehem, in the county of Northampton and State of Pennsylvania, have invented an Improvement in Mechanical Fingering Devices for Stringed Musical Instruments, of which the following is a specification.

My present invention relates to a mechanical fingering device for stringed musical instruments, and is an improvement upon the form and construction of the apparatus for a similar purpose as shown and described in Letters Patent No. 1,094,038, granted April 21, 1914, jointly to Roland W. Weaver and myself. In the apparatus constructed in accordance with the disclosure made in the patent aforesaid there are a plurality of mechanical fingers arranged in sets and operated by slidably reciprocating bars by means of a corresponding number of inclined surfaces or planes actuated in turn by a plunger and a depressible lever in order to cause the mechanical fingers to contact with the strings of the instrument to enable the player to strike the strings and produce predetermined chords in playing accompaniments. The purpose of the invention in the present case is similar in all respects to that of the apparatus shown and described in the patent. That is, to make is possible for anyone to easily learn to play accompaniments on any of the stringed instruments to which the invention may be applied, as for example, a banjo, a guitar, a mandolin, a violin, a cello, a ukulele, and the like. In the use of the apparatus as disclosed in the patent, however, due to the fact that the various operating parts are unyielding, and due to the further fact that instruments to which the invention is applied are not always uniformly constructed, some difficulty has been experienced in the operation of the apparatus in not always uniformly depressing the strings when contact is made therewith by the mechanical fingers. In the apparatus made in accordance with the patent furthermore a given lever is adapted to depress the mechanical fingers associated therewith for contacting with the strings of the instrument to play one chord only which obviously multiplies the number of levers necessarily employed and correspondingly complicates the apparatus.

The object of my invention is to overcome these difficulties and to simplify the construction of the device in such a manner that the levers are dispensed with and a plurality of revoluble shafts employed instead, the shafts being so connected to sets of mechanical fingers as to operate one set when the shafts are turned in one direction and another set, if desirable, when the shafts are turned in the opposite direction, while the devices connecting the shafts and the fingers are flexible and preferably shiftable so that a substantially uniform tension is applied to all the fingers in a given set when operated through the said devices by the said shafts to obtain a satisfactory operation of the apparatus which will be hereinafter more particularly described.

In the drawing:

Fig. 1 is a plan of my improved mechanical fingering device for stringed musical instruments illustrating the same as applied to a guitar.

Fig. 2 is a side elevation of the same.

Fig. 3 is a plan with the top removed to show the construction of the apparatus.

Fig. 4 is an inverted plan.

Fig. 5 is an elevation and partial section.

Fig. 6 is a view similar to Fig. 5 showing one of the operating parts in a different position.

Fig. 7 is a transverse section through the neck of the instrument and an end elevation of the apparatus.

Fig. 8 is a section on line 8—8, Fig. 5, and

Fig. 9 is a section on line 9—9, Fig. 6.

Referring to the drawing, the apparatus made in accordance with my present invention includes a suitable casing which may be made of wood, metal or any material adapted for this purpose. As illustrated the casing includes side members 10 and 11, end members 12 and 13 and a top or cover 14. The side members 10 and 11 and the end members 12 and 13 are connected by means of screws 15, 16 or otherwise, and the top member is secured in position by being connected to the side members by screws 17, 18 or otherwise. As will be understood the casing is open at the bottom or underside thereof.

In suitably spaced oppositely disposed positions in the side members 10 and 11 there are sets of posts 19, 20, 21 and 22. These posts are suitably secured in the side members and have screw threaded portions extending appreciable distances from the side members. On the posts 19 and 20 there are nuts 23, and similarly on the posts 21 and 22 there are nuts 24 adapted to be turned down against the lower surfaces of the side members to maintain the posts in position therein. Also on the screw threaded portions of the posts 19 and 20 there are nuts 25, and in like manner on the posts 21 and 22 there are nuts 26. Extending between the posts 19 and 20 and provided with suitable apertures through which the posts pass there is a plate 27. Similarly extending between the posts 21 and 22 and provided with apertures through which these posts pass there is a corresponding plate 28. The plates 27 and 28 are adapted to lie against the outer face or fret board of the neck 29 of the musical instrument to which the apparatus is applied, these plates 27 and 28 contacting with the surface lying between spaced frets thereon when frets are employed and lying below the strings of the instrument. These plates form part of the apparatus for clamping the attachment in position on the instrument. This attaching apparatus also includes a clamp yoke 31 associated with the posts 19 and 20 and a similar clamp yoke 32 associated with the posts 21 and 22, together with binding nuts 33 on the posts 19 and 20, and similar binding or clamping nuts 34 on the posts 21 and 22. The clamp yokes 31 and 32 are so constructed as to receive the outer face of the neck of the instrument preferably with intervening layers of felt 30 or other similar material to assist in maintaining the apparatus in position when connected and also to absorb a portion at least of vibrations produced in the use of the apparatus, while obviously the nuts 25 and 26 are employed to determine the height at which the apparatus may be adjusted to position above the keyboard and the nuts 33 and 34 to clamp the apparatus in place in this position.

In carrying out the invention I employ a plurality of shafts or other revoluble members, depending in number upon the number of combinations of sets of mechanical fingers to be operated by the apparatus. These shafts are indicated in the present case as three in number and designated respectively at 35, 36 and 37, although as will be understood any number of these shafts may be employed. Each of these shafts extends across the apparatus, being journaled at one end in a suitable bearing provided therefor in the side member 10, extending through the other side member 11, and exteriorly thereof each of the shafts is provided with an extension terminating in a handle, the handles for the respective shafts being designated by 38, 39 and 40. The shafts furthermore, as illustrated, are retained in their positions by means of cotter pins 41 or otherwise. Associated with each shaft I employ a plurality of arms connected thereto, extending therefrom and adapted to engage with a flexible member for connection with the mechanical fingers hereinafter described. As illustrated, I have shown each shaft provided with a pair of these arms. The shaft 35 therefore has an arm 42 extending therefrom and at its extremity provided with an eye 43. The other arm associated with the shaft 35 is indicated at 44, and similarly this is provided with an eye 45 at its extremity. The arms connected to and extending from the shaft 36 are designated by 46 and 48, and the eyes at the extremities thereof are designated respectively at 47 and 49. In the same manner the arms connected to and extending from the shaft 37 are indicated at 50 and 52, while the eyes at the extremities thereof are designated by 51 and 53 respectively.

I also employ a plurality of mechanical fingers each preferably pivotally mounted and adapted to be swung to engage with a string of the instrument to which the apparatus is attached in order to depress the string behind a fret or in a predetermined position to determine the vibratory length of the string and consequently the pitch of the sound created thereby. Each of these mechanical fingers is preferably triangular in outline. These mechanical fingers are employed in sets and as indicated in the drawing three sets of the same are illustrated. The mechanical fingers are designated by the reference characters 54 to 63 inclusive. The mechanical fingers 54, 55, 56 and 57 are mounted on a rod 64 extending between and suitably secured in the side members 10 and 11 of the casing. These mechanical fingers 54, 55, 56 and 57 are suitably spaced by means of spacer sleeves 65 mounted on the rod 64 and extending between the fingers so as to cause each one of these fingres to lie immediately above a string of the instrument to which the apparatus is attached. The mechanical fingers 58, 59, 60 and 61 are likewise mounted on a rod 66 and spaced by means of spacer sleeves 67 mounted thereon and extending between the mechanical fingers. In like manner the mechanical fingers 62 and 63 are mounted on a rod 68 and spaced by means of spacer sleeves 69 thereon. It will be understood that the rods 64, 66 and 68 are spaced similarly to the frets of the instrument or in such a manner as to properly place the mechanical fingers so that when engaging the strings of the instrument the strings are depressed and maintained in contact with the finger board or face of the neck of the instrument.

The mechanical finger 54 is provided with an eye 70 and a suitable spring or other tension device 71 extends between the eye 70 and a rod 72 which extends between and is secured in the side members 10 and 11.

The spring 71 is adapted to turn and normally maintain the mechanical finger 54 in an initial position and the rod 72 is adapted to act as a stop rod for the mechanical fingers 58, 59, 60 and 61 to determine the initial positions thereof. The mechanical finger 55 is provided with an eye 73 which is connected to the rod 72 by a spring 74, and similarly the mechanical fingers 56 and 57 are provided with eyes 75 and 77 connected respectively to the rod 72 by springs 76 and 78. The mechanical finger 58 is provided with an eye 79 connected by a spring 80 with a rod 81 which extends between and is secured in the side members 10 and 11 of the casing. Similarly the mechanical fingers 59, 60 and 61 are provided respectively with eyes 82, 84 and 86 connected by the springs 83, 85 and 87 with the rod 81 which also acts as a stop rod for the mechanical fingers 62 and 63 in order to determine the initial positions thereof. The mechanical finger 62 is provided with an eye 88 and the mechanical finger 63 with an eye 89. The purpose of the eyes 88 and 89 will be hereinafter more fully set forth. The mechanical finger 62 is also provided with an eye 90 which is connected by a spring 91 to an eye 92 fixed in the end member 13. In a similar manner the mechanical finger 63 is provided with an eye 93 connected by a spring 94 to an eye 95 also secured in the end member 13 of the casing. There is also a stop 96 extending between and secured in the side members 10 and 11 which acts as a stop rod to determine the initial positions of the mechanical fingers 54, 55, 56 and 57.

As hereinbefore stated the invention as illustrated is applicable to a guitar, the strings of which are illustrated in dotted lines in Fig. 1 and designated by the reference characters 97 to 102 inclusive.

In order to operate the several sets of mechanical fingers the same are connected by means of the eyes associated therewith with the eyes carried at the ends of the arms secured in the shafts 35, 36 and 37. The means for connecting these parts of the apparatus are preferably flexible cords made of any suitable material. These cords are passed respectively through the eyes at the ends of the arms moved by the shafts and also through the eyes attached to one or more of the mechanical fingers. Each cord is a closed or continuous unit, both parts of which are passed through the eyes carried by the arms attached to the shafts so as to slide therein and passed singly through the eyes carried by the mechanical fingers so as also to be shiftable in the same whereby, as will be understood, the cords or other flexible devices in moving the mechanical fingers and depressing the strings of the instrument may slide or adjust themselves so as to create a substantially uniform pull against the several mechanical fingers to produce an even pressure against the several strings upon which these fingers are brought to bear. As illustrated in the drawing, for example, a cord 103 is passed through the eye 73 of the mechanical finger 55, is passed through the eye 51 of the arm 50 carried by the shaft 37 and also through the eye 89 attached to the mechanical finger 63, and a cord or flexible device 104 is threaded through the eye 77 carried by the mechanical finger 57, is threaded through the eye 53 at the end of the arm 52 carried by the shaft 37 and also through the eye 70 carried by the mechanical finger 54. It will therefore be understood that by moving the handle 40 of the shaft 37 in a clockwise direction as shown in Fig. 6 of the drawing the arm 52 and its eye 53 will be swung accordingly by the movement of the shaft 37. This movement of the arm 52 will cause the cord 104 to be drawn taut to swing the mechanical fingers 54 and 57 on the rod 64 so as to bring these members into contact with the strings 97 and 102 depressing these strings behind the fret 110. At the same time apparently the cord 103 will be permitted to hang freely between the eyes through which it is passed. When the handle thus moved is released the springs 71 and 78 will return the parts to their normal initial positions. As will also be apparent when the handle is moved in the opposite direction, that is in a counter clockwise direction the arm 50 will be swung accordingly by the movement imparted to the shaft 37 and this movement of the arm 50 causes the cord 103 to be drawn taut and to swing the mechanical fingers 58 and 63 to bring the same into contact with the strings 98 and 101, depressing the same respectively immediately behind the frets 111 and 112. When the handle 40 as thus moved is released the springs 80 and 94 will return the parts to their normal positions.

In a similar manner cords 105 and 106 are employed to operate the mechanical fingers 56, 59 and 61. The cord 105 is passed singly through the eye 82 of the mechanical finger 59, is passed doubly through the eye 47 carried by the arm 46 and is passed singly through the eye 75 carried by the mechanical finger 56. The cord 106 is passed singly through the eye 82 carried by the mechanical finger 59, is passed doubly through the eye 47 carried by the arm 46 and is passed singly through the eye 86 carried by the mechanical finger 61. By this connection, as will be understood, when the handle 39 connected to the shaft 36 is turned in a counter clockwise direction the shaft will be turned likewise and the arm 46 and its eye 47 shifted accordingly to draw the cords 105 and 106 taut and to swing the mechanical fingers 59, 56 and 61 to depress respectively the strings 100, 101 and 102 of the instrument, the mechanical fingers 59 and 61 being used to depress the strings 100 and 102 behind the fret 111 and the mechanical finger 56 to depress the string 101 behind the fret 110.

A cord 107 is employed to depress the mechanical fingers 59 and 60. For this purpose the cord 107 is passed singly through the eye 84 carried by the mechanical finger 60, is passed doubly through the eye 49 carried by the arm 48 and is passed singly through the eye 82 carried by the mechanical finger 59. Consequently, when the handle 59 as illustrated in Fig. 5 is moved in a clockwise direction the shaft 36 and the arm 48 are moved correspondingly causing the eye 49 to draw the cord 107 taut to swing the mechanical fingers 59 and 60 so as to bring the same into contact with and to depress the strings 100 and 101 behind the fret 111.

As illustrated I also employ a cord 108 for operating the mechanical fingers 58 and 61 by means of the shaft 35 and the handle 38 associated therewith. This cord 108 for example is threaded singly through the eye 79 carried by the mechanical finger 58, is threaded doubly through the eye 43 carried by the arm 42 and is threaded singly through the eye 86 carried by the mechanical finger 61. Consequently when the handle 38 as illustrated in Fig. 5 is moved in a counter clockwise direction the shaft 35 and the arm 42 are correspondingly moved so that the eye 43 draws the cord 108 taut and swings the mechanical fingers 58 and 61 causing the same to contact with and to depress the strings 98 and 102 behind the fret 111. The cord 109 is employed to actuate the mechanical finger 62 and is threaded through the eye 88 carried thereby and also through the eye 45 carried by the arm 44 so that when the handle 38 as illustrated in Fig. 5 is moved in a clockwise direction the shaft 35 and the arm 44 are correspondingly moved to draw the cord 109 taut in order to swing the mechanical finger 62 to the position in which the same bears against the string 101 and depresses the same behind the fret 111. Obviously the combinations of mechanical fingers as illustrated and described are merely illustrative as numerous other and similar combinations may be employed without departing from the nature and spirit of my invention.

At the upper or head end of the apparatus the lower face of the end member 13 is preferably provided with a pad 113 made of suitable material and attached thereto by tacks 114 or otherwise. When the apparatus is attached to the instrument so that the same is placed with the strings in their open positions the pad 113 is adapted to rest against the nut 115 at the top of the finger board or face of the neck and over which in the usual manner the strings of the instrument are passed and connected to the tension devices by which the strings are adjusted in tuning the instrument. It will be apparent that the apparatus may be shifted to various positions on the neck of the instrument to vary the length of the strings and that in so doing the pad 113 is employed to depress the strings behind any predetermined fret and consequently to serve the purpose of a capo tasto in shortening the vibrating length of the open strings as may be desired.

It will now be understood that in carrying out the invention the shafts as described, or other suitably movable or revoluble members, may be employed for actuating the mechanical fingers which may be of any suitable type and are connected to the shafts or other movable members by the flexible cords or other similar and equivalent means.

I claim as my invention:

1. A mechanical fingering apparatus for stringed musical instruments comprising a casing, a shaft revolubly mounted in the casing, a plurality of mechanical fingers arranged in sets, each mechanical finger being pivotally mounted in the casing, and flexible devices connecting the revoluble shaft with each set of mechanical fingers whereby when the shaft is turned in one direction one set of mechanical fingers is moved to press against strings of the instrument and when the revoluble shaft is moved in the opposite direction another set of mechanical fingers are moved to bear against other strings of the musical instrument.

2. A mechanical fingering apparatus for stringed musical instruments comprising a casing, a shaft revolubly mounted in the casing, a plurality of mechanical fingers arranged in sets, each mechanical finger being pivotally mounted in the casing, flexible devices connecting the revoluble shaft with each set of mechanical fingers whereby when the shaft is turned in one direction one set of mechanical fingers is moved to press against strings of the instrument and when the revoluble shaft is moved in the opposite direction another set of mechanical fingers are moved to bear against other strings of the musical instrument, and means for securing the casing in position on the neck of the musical instrument.

3. A mechanical fingering apparatus for stringed musical instruments comprising a casing, a shaft revolubly mounted in the casing, a plurality of mechanical fingers arranged in sets, each mechanical finger being pivotally mounted in the casing, flexible devices connecting the revoluble shaft with each set of mechanical fingers whereby when the shaft is turned in one direction one set of mechanical fingers is moved to press against strings of the instrument and when the revoluble shaft is moved in the opposite direction another set of mechanical fingers are moved to bear against other strings of the musical instrument, and means for returning and normally maintaining the mechanical fingers in an initial position.

4. A mechanical fingering apparatus for stringed musical instruments comprising a casing, a shaft revolubly mounted in the casing, an arm having an eye therein extending from the said shaft, a mechanical finger pivotally mounted in the said casing, an eye attached to the said finger, and a flexible device threaded through, shiftable in, and connecting the said eyes so that when the shaft is revolved the mechanical finger is moved to bear upon and depress a string of the musical instrument.

5. A mechanical fingering apparatus for stringed musical instruments comprising a casing, a shaft revolubly mounted in the casing and having an arm with an eye at the end thereof secured in the shaft, a plurality of mechanical fingers, an eye attached to each of the mechanical fingers, and a flexible device threaded through and shiftable in the said eyes whereby when the shaft is revolved the flexible device is drawn taut and swings the mechanical fingers into contact with strings of the musical instrument so as to depress the same.

6. A mechanical fingering apparatus for stringed musical instruments comprising a casing, a shaft revolubly mounted in the said casing, an arm having an eye at the end thereof attached to the said shaft, a second arm also having an eye at the end thereof attached to the said shaft, a plurality of mechanical fingers arranged in sets, an eye attached to each of the mechanical fingers, and flexible devices threaded respectively through the eye at the end of one of the said arms and the eyes in one set of mechanical fingers and the eye at the end of the other arm and the eyes attached to the other set of mechanical fingers whereby when the shaft is turned in one direction the mechanical fingers in one set are moved to depress strings of the instrument and when the shaft is turned in the other direction the mechanical fingers in the other set thereof are moved to depress other strings of the musical instrument.

7. A mechanical fingering apparatus for stringed musical instruments comprising a casing, a plurality of shafts revolubly mounted in the said casing, arms having eyes at the ends thereof secured in each of the said shafts, a plurality of mechanical fingers each pivotally mounted in the said casing, an eye connected to each of the mechanical fingers, and cords threaded through the eyes at the end of each of the said arms and through the eyes of the sets of mechanical fingers whereby when any shaft is turned in one direction a set of mechanical fingers is moved to bear against and depress predetermined strings of the musical instrument and when turned in the opposite direction another set of mechanical fingers is moved to bear against and depress other strings of the musical instrument.

8. A mechanical fingering apparatus for stringed musical instruments comprising a casing, a plurality of shafts each mounted to turn in the said casing, a plurality of mechanical fingers, flexible devices extending between and connecting the several shafts with predetermined mechanical fingers whereby when any shaft is turned the mechanical fingers associated therewith are moved to depress predetermined strings of the musical instrument, and means for returning and normally maintaining the mechanical fingers in an initial position.

9. A mechanical fingering apparatus for stringed musical instruments comprising a casing, a plurality of shafts each mounted to turn in the casing, a plurality of mechanical fingers each pivotally mounted in the casing and arranged in sets, flexible devices extending between and connecting each revoluble shaft with a set of mechanical fingers whereby when any shaft is turned the mechanical fingers in the set associated therewith are moved to bear against and depress predetermined strings of the musical instrument, and means for returning and normally maintaining the mechanical fingers in an initial position.

10. A mechanical fingering apparatus for stringed musical instruments comprising a casing, a plurality of shafts revolubly mounted in the said casing, arms having eyes at the ends thereof secured in each of the said shafts, a plurality of mechanical fingers each pivotally mounted in the said casing, an eye connected to each of the mechanical fingers, cords threaded through the eyes at the end of each of the said arms and through the eyes of the sets of mechanical fingers whereby when any shaft is turned in one direction a set of mechanical fingers is moved to bear against and depress predetermined strings of the musical instrument and when turned in the opposite direction another set of mechanical fingers is moved to bear against and depress other strings of the musical instrument, and a spring associated with each mechanical finger for returning and normally maintaining the same in an initial position.

Signed by me this 25th day of January, 1924.

CHARLES H. WEAVER.